March 20, 1951 J. BAILEY 2,545,868
METHOD OF AND APPARATUS FOR MANUFACTURING PLASTIC SHEETS
Filed Oct. 11, 1947 2 Sheets-Sheet 1

INVENTOR
JAMES BAILEY
BY *Parham & Bates*
ATTORNEYS

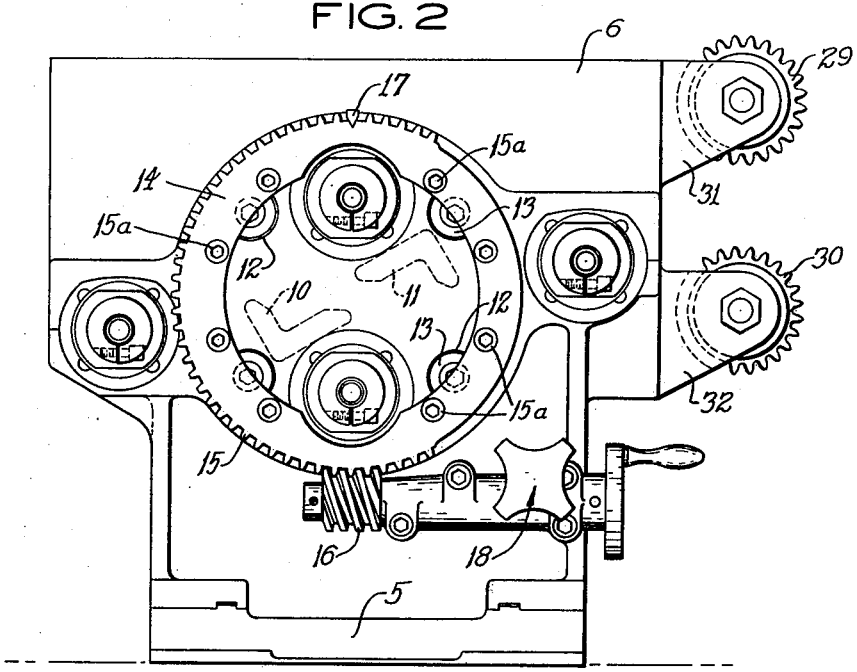

Patented Mar. 20, 1951

2,545,868

UNITED STATES PATENT OFFICE 2,545,868

METHOD OF AND APPARATUS FOR MANUFACTURING PLASTIC SHEETS

James Bailey, West Hartford, Conn., assignor to Plax Corporation, Hartford, Conn., a corporation of Delaware Application October 11, 1947, Serial No. 779,386

9 Claims. (Cl. 18—12)

This invention relates to the production of continuous sheet of molecularly oriented organic polymer and has particular relation to the production of such sheet by heating and extruding polymer in the form of a ribbon and drawing the ribbon longitudinally and transversely to form a molecularly oriented sheet of the desired width and thickness.

It is well known that the strength of certain organic polymers may be substantially increased by drawing so as to orient the molecules of the polymer in the direction or directions in which the stress is applied and capturing the orientation stresses therein. Examples of such polymers are the vinyl compounds and derivatives such as polystyrene, vinyl chloride and co-polymers of or including such compounds or derivatives.

Controlling factors of a process for extruding oriented sheet include the temperature at which the polymer is extruded, the temperature at which the polymer is stretched and the subsequent establishment in the polymer of a temperature which captures the orientation stresses introduced by stretching.

U. S. Patent No. 2,412,187, granted December 3, 1946, to F. E. Wiley et al., disclosed a process and apparatus for producing oriented sheet of the type heretofore described. The apparatus there shown includes an extruder and die for producing a continuous ribbon of polymer, an oven for conditioning the extruded ribbon to an optimum drawing temperature, means for stretching the ribbon at the latter temperature, means for reducing the temperature of the stretched sheet so as to capture and retain the stretching or orientation stresses in the ribbon after the ribbon has been released from the stretching means, and means in the form of festooning rolls located intermediate the stretching means and the die for reducing or eliminating the stretching stresses in that portion of the ribbon between the festooning rolls and the extrusion die or nozzle. Inasmuch as the optimum extruding temperature for most polymers is higher than the optimum temperature at which stretching stresses should be exerted to establish molecular orientation, the inclusion of festooning rolls, which restrict the stretching stresses to the downstream portion of the ribbon and reduce or eliminate stressing of the upstream portion intermediate the die and festooning rolls, permits employment of different optimum extruding and stretching temperatures, rather than requiring compromising on a single extruding and stretching temperature.

As pointed out in the aforementioned patent to Wiley et al. the festooning rolls preferably are driven at a pre-determined speed such that the thickness of the ribbon between the die and the first rolls is not substantially reduced. Thus, there is no substantial stretching of the ribbon between the end of the die and the rolls. The driving of the ribbon by the rolls may be facilitated by so controlling the temperature of the rolls that the ribbon adheres somewhat to the rolls. Preferably the temperature effect of the rolls on the ribbon is so regulated as to superficially chill the ribbon leaving more or less heat in the ribbon to assist in re-heating it to a pre-determined lower temperature for the drawing operation.

Achievement of the desired effects on the ribbon is dependent largely upon the total angular wrap of the ribbon about the festooning rolls and, in practice, it has been found desirable to be able to adjust the amount of wrap.

Accordingly, an object of the present invention is to provide sheet extruding and oriented apparatus of the type illustrated in the Wiley et al. patent having festooning roll mechanism by means of which the amount of wrap may be readily adjusted from a minimum to a maximum wrap, and to any intermediate wrap between those limits, without interrupting the passage of sheets through the festooning rolls and through the sheet producing apparatus of which the festooning rolls form a part.

A still further object is to provide improvements in the methods and apparatus heretofore employed in producing sheet of the type indicated.

These and other objects and advantages of the invention will be brought out in the following specification or will be apparent therefrom or from the accompanying drawings to which the specification refers and in which drawings:

Fig. 2 is a more detailed view also in side elevation and on a larger scale of the festooning roll assembly;

Fig. 3 is a partial cross-sectional view revealing certain constructional features of the mounting for the festooning roll assembly.

Figure 1:
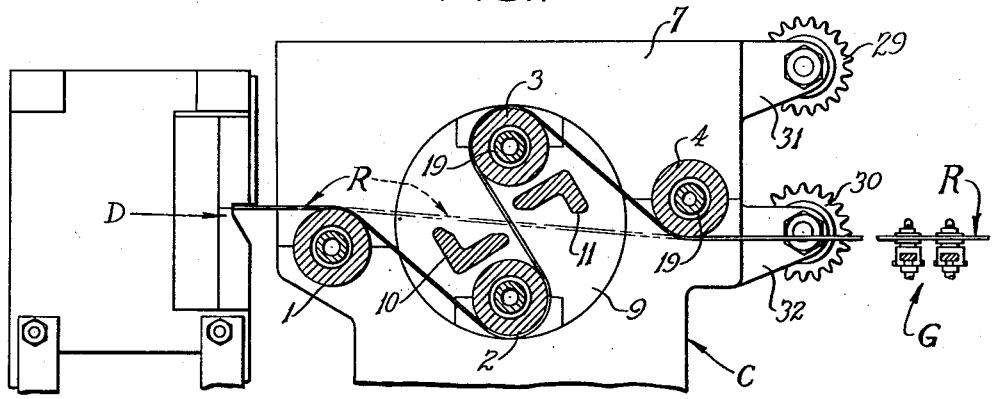
Fig. 1 is a side elevation view of a die and gripper bars together with a novel festooning roll assembly for producing molecularly oriented plastic sheets in accordance with the invention; the festooning roll assembly being shown in cross section substantially as viewed from line I—I of Fig. 3.

Referring to Fig. 1, it will be seen that the principal parts of the apparatus there illustrated include an extrusion die D through which a heated organic polymer such as polystyrene may be forced, as by means of a stuffer, and extruded in the form of a flat ribbon R; a festooning roll assembly C including a group of four festooning rolls the position of two of which may be adjusted so as to vary, through a wide range, the amount of wrap of the ribbon R thereabout, and gripping and drawing mechanism indicated generally at G for drawing the ribbon into molecularly oriented sheet. The die D is more or less diagrammatically shown, it being understood that a variety of dies are available for extruding the plastic ribbon R. Similarly, the grippers G, shown in Fig. 1, are merely illustrative of stretching mechanism generally as, for example, that illustrated and described in detail in the aforementioned patent to Wiley et al.

Referring more particularly to the festooning roller assembly C, there are provided four driven rolls 1, 2, 3 and 4 which are rotatably supported in parallel relationship relative to one another in a suitable frame. Rolls 1 and 4 are supported in fixed bearings which are located so that roll 1 lies adjacent to the die D and in contact with bottom of the ribbon R and the roll 4 away from the die and in contact with the top of the ribbon when the latter is drawn in a generally horizontal direction by the grippers G from the die. The rolls 2 and 3 are located intermediate rolls 1 and 4 and on opposite sides above and beneath the ribbon R, the rolls 2 and 3 having movable bearings which permit interchange of the positions of the rolls relative to each other. Thus, as is apparent from an inspection of Fig. 1, the roll 2 may be moved from a position above the roll 3 and out of contact with the ribbon R into wrapping contact and to a position beneath the roll 3, thereby festooning the ribbon.

For details of the festooning assembly C, reference may be had to Figs. 2 and 3 wherein the assembly is illustrated as comprising a frame or base member 5 having a pair of parallel spaced vertical side members 6 and 7 in which the rolls 1 and 4 are rotatably mounted. The side members 6 and 7 are also provided with oppositely disposed circular openings in which bearing races 6a and 7a rotatably support circular end members 8 and 9 of a bearing mounting for the bearings of rolls 2 and 3. A pair of L-shaped channel irons 10 and 11 are welded or otherwise secured at their ends to the circular end members 8 and 9 so that the bearing mounting thus formed somewhat resembles a squirrel cage. Each of the end members 8 and 9 has four equally spaced circular recesses 12 in which rollers 13 are secured in roller contact with the bearing races 6a and 7a.

The rolls 2 and 3 are disposed diametrically from each other in the circular end plates 8 and 9 of the bearing mounting and, as heretofore stated, together with the mounting are rotatably adjustable within a range which, in the embodiment illustrated, is somewhat greater than 180°. To this end a worm wheel 14, having worm gear teeth 15 cut in slightly more than 180° of its periphery, is secured by bolts 15a to the end plate 8. A manually operable worm 16 is provided with which to angularly orient the mounting and its rolls 2 and 3 to a desired position within the range permitted by the teeth 15. An indicator finger 17 may be provided for readily locating the rolls 2 and 3 in desired positions, and a manually operable locking mechanism indicated generally by the numeral 18 also provided for securing the worm 16 and worm gear 15, and consequently the rolls 2 and 3 at the desired position of adjustment.

Referring now to the details of the festooning rolls 1, 2, 3 and 4, they are alike in their construction and arrangement of parts and, consequently, a description of one will suffice as a description of all. More particularly, each roll includes an inner shaft 19 spaced from and rotatably mounted, as by means of bearings 20, relative to a concentric outer shaft 21. The annular space between the inner and outer shafts 19 and 21 constitues a channel 22 for the flow of cooling fluid which may be supplied thereto through the concentric bores 23 and radially disposed communicating passages 24 in the ends of the inner shafts 19. Suitable packing rings 25 may, of course, be provided to reduce loss of cooling fluid from between the ends of the concentric shafts 19 and 21.

Figure 4:
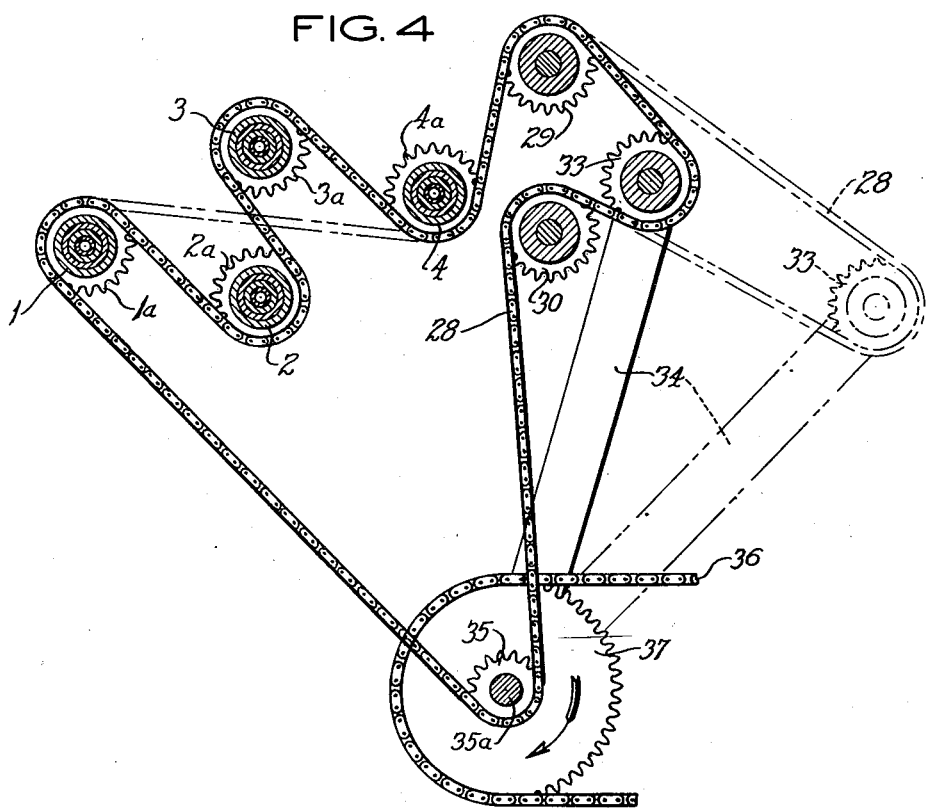
Fig. 4 is a cross-sectional view taken on line 4—4 of Fig. 3 illustrating the drive for the festooning roll assembly.

Each of the outer shafts is itself rotatably mounted by means of bearings 26 in the circular end plates 8 and 9, collars 27 being provided to reduce end play in the bearings. Also secured to the outer shaft 21 of each roll 1 through 4, inclusive, are the respective sprockets 1a, 2a, 3a and 4a which together with chain 28 provide means for driving the individual rollers. As shown in Figs. 1 and 4, the additional sprockets 29 and 30 are rotatably mounted in vertically spaced relationship on lugs 31 and 32 attached to the frame member 7. Still another sprocket 33 is rotatably mounted in line with the other sprockets on a pivotably supported arm 34, the sprocket 33 and arm 34 providing a take up mechanism for the chain when the positions of the rolls 2 and 3 are moved within the range permitted by the worm gear 15 and worm 16.

The chain 28 is driven by a drive sprocket 35 which, in turn, may be driven by a variable speed drive or other suitable source of power (not shown) as through a chain 36 and sprocket 37 mounted on drive shaft 35a.

In the operation of the above-described apparatus the organic polymer, such as for example, polystyrene, from which biaxially oriented sheet is to be formed is heated to an optimum extrusion temperature (370° F.) and while in a solvent free condition is continuously extruded through the die D in the form of the ribbon R. The ribbon R is continuously conveyed by the rolls 1, 2, 3 and 4 to the grippers G which may draw the ribbon longitudinally from the rolls as well as transversely in the manner described in the aforementioned patent to Wiley et al. As described in that patent, the temperature of the ribbon may be predeterminedly controlled in one or more enclosing ovens and by suitable heating means. The extruded ribbon first passes through the rolls in the position illustrated in phantom in Fig. 1 with the grippers G conveying the ribbon forward faster than the extrusion rate and with the consequent necessary elongation of the ribbon occurring in the hot portion of the ribbon, adjacent the die. Inasmuch as the ribbon is preferably extruded at a temperature of 370° F., or higher, little if any of the stretching is retained as permanent orientation, the relatively high temperature acting to release the orientation before the temperature of the ribbon is sufficiently lowered for the polymer to retain its elastic memory. In order to relieve the hot ribbon adjacent the die from the stretching forces established by the grippers G, the bearing assembly for the rolls 2 and 3 is rotated by means of the worm 16, the roll 2 moving counterclockwise from the position of roll 3 (Fig. 1) first into contact with the ribbon R (phantom view) and thence to the position which it occupies in Fig. 1. At the same time roll 3 moves from the position of roll 2 clockwise to the position which it occupies in Fig. 1, thus festooning the ribbon R as shown in solid lines. It is apparent that the degree of wrap of the ribbon R about each of the rolls 1, 2, 3 and 4, and consequently, the stretching stress in the portion of the ribbon between each adjacent pair of rolls and between the die D and roll 1 may be controlled by adjusting the angular disposition of the rolls 2 and 3. It is also apparent that the adjustment may be effected without discontinuing the continuous extrusion and drawing operations.

In order to maintain the necessary contact between the rolls 1 through 4, inclusive, and the ribbon R so that each roll exerts a frictional pull on the ribbon, it may be necessary to exert at least a slight stretching stress on the portion of the ribbon between the die D and the roll 1. As a result, some stretching of the ribbon may occur between each pair of adjacent rolls. It has been found that where a tendency toward "jumpy" or uneven stretching occurs, such as is evidenced by periodic rather than uniform slippage over the rolls, particularly rolls 3 and 4, the condition may be substantially corrected by speeding up those rolls. Thus, for example, if sprockets 1a and 2a are each provided with 30 teeth, roll 3 may be provided with twenty-nine teeth and roll 4 with twenty-eight. This tends to assure the uniformity of the slight slippage of the ribbon on the rolls and a consequent uniform extension and corresponding uniform reduction in width of the ribbon in passing over the rolls.

When polystyrene is the material involved, roll 1 preferably is cooled to 60° F. by circulating water of that temperature therethrough, and the remaining rolls 2, 3 and 4 are heated to a temperature of 150 to 190° F. by passing water of that temperature therethrough.

Various changes may be made in the process and apparatus described above without departing from the scope of the appended claims.

Having thus described my invention, I claim:

1. Apparatus for forming continuous oriented sheet of solvent-free organic, thermoplastic polymer comprising means including a die for extruding the polymer at a selected extruding temperature in the form of a ribbon, means for drawing said ribbon away from said die at a speed faster than the ribbon is extruded, means positioned intermediate said die and said drawing means for superficially chilling each successive portion of the extruded ribbon and for maintaining substantially constant the dimensions of each portion of the ribbon between the die and said intermediate means, said intermediate means including a plurality of ribbon festooning rolls, and means for adjusting the positions of said rolls relative to each other and thereby varying the degree of wrap of the ribbon about said rolls while continuously drawing said ribbon therethrough.

2. Apparatus for forming continuous oriented sheet of solvent-free organic, thermoplastic polymer comprising means including a die for extruding the polymer at a selected extruding temperature in the form of a ribbon, means for drawing said ribbon away from said die at a speed faster than the ribbon is extruded, means positioned intermediate said die and said drawing means for superficially chilling each successive portion of the extruded ribbon and for maintaining substantially constant the dimensions of each portion of the ribbon between the die and said intermediate means, said intermediate means including a plurality of ribbon festooning rolls, means for adjusting the positions of said rolls relative to each other and transversely of the film to thereby vary the degree of wrap of the ribbon about said rolls while continuously drawing said ribbon therethrough, and wherein said rolls are out of contact with said ribbon in one of their positions of adjustment.

3. Apparatus for forming continuous oriented sheet of solvent-free organic, thermoplastic polymer comprising means including a die for extruding the polymer at a selected extruding temperature in the form of a ribbon, means for drawing said ribbon away from said die at a speed faster than the ribbon is extruded, means positioned intermediate said die and said drawing means for superficially chilling each successive portion of the extruded ribbon and for maintaining substantially constant the dimensions of each portion of the ribbon between the die and said intermediate means, said intermediate means including a plurality of ribbon festooning rolls, means for adjusting the relative positions of said rolls and thereby varying the degree of wrap of the ribbon about said rolls while continuously drawing said ribbon therethrough, and means for locking said adjustment means with said rolls in desired positions of predetermined wrap.

4. Apparatus for forming continuous oriented sheet of solvent-free organic, thermoplastic polymer comprising means including a die for extruding the polymer at a selected extruding temperature in the form of a ribbon, means positioned adjacent to said die to superficially chill each successive portion of the extruded ribbon and to maintain substantially constant the dimensions of each portion of the ribbon between the die and said means, said means including a plurality of ribbon festooning rolls having successively increased surface speeds downstream of the die, and means for stretching and orienting said ribbon downstream of one of said rolls.

5. Apparatus for forming continuous oriented sheet of solvent-free organic, thermoplastic polymer comprising means including a die for extruding the polymer at a selected extruding temperature in the form of a ribbon, means positioned adjacent to said die to superficially chill each successive portion of the extruded ribbon and to maintain substantially constant the dimensions of each portion of the ribbon between the die and said means, said means including a plurality of ribbon festooning rolls and means for varying the degree of wrap of the ribbon about said rolls while continuously conveying said ribbon therethrough, synchronous drive means for driving the first of said rolls independently of the ribbon at substantially the extrusion speed and the successive festooning rolls at successively increased peripheral speeds, and means for stretching and orienting said ribbon downstream of one of said rolls.

6. Apparatus for forming continuous oriented sheet of solvent-free organic, thermoplastic polymer comprising means including a die for extruding the polymer at a selected extruding temperature in the form of a ribbon, means positioned adjacent to said die to superficially chill each successive portion of the extruded ribbon and to maintain substantially constant the dimensions of each portion of the ribbon between the die and said means, said means including a plurality of ribbon festooning rolls, and means including movably mounted bearings for at least one of said rolls for varying the relative positions of said rolls and the degree of wrap of the ribbon about said rolls while continuously conveying said ribbon therethrough, and means for stretching and orienting the portion of said ribbon downstream of one of said rolls.

7. The process of making a continuous sheet of molecularly oriented thermoplastic polymer which comprises the steps of heating said polymer in a solvent-free condition to an extrusion temperature, extruding the polymer at the extrusion temperature from a die in the form of a hot continuous ribbon, festooning said ribbon about a series of rolls, maintaining the first of said rolls at approximately 60° F., maintaining subsequent festooning rolls at a drawing temperature below the extrusion temperature and above the softening point of the polymer, drawing and stretching said ribbon away from said rolls at greater than the extrusion speed, cooling said ribbon under stretching stress.

8. The process of making a continuous sheet of molecularly oriented thermoplastic polymer which comprises the steps of heating said polymer in a solvent-free condition to an extrusion temperature, extruding the polymer at the extrusion temperature from a die in the form of a hot continuous ribbon, festooning said ribbon about a series of rolls, maintaining the first of said rolls at approximately 60° F., maintaining subsequent festooning rolls at approximately the softening point temperature of the polymer, drawing and stretching said ribbon away from said rolls at greater than the extrusion speed, cooling said ribbon under stretching stress, and positively driving at least the first of said rolls at a speed substantially synchronized with the ribbon extrusion speed.

9. The process of making a continuous sheet of molecularly oriented polystyrene which comprises the steps of heating said polymer in a solvent-free condition to an extrusion temperature of approximately 370° F., extruding the polymer at the extrusion temperature from a die in the form of a hot continuous ribbon, festooning said ribbon about a series of rolls, maintaining the first of said rolls at approximately 60° F., maintaining subsequent festooning rolls at a drawing temperature of approximately 150 to 190° F., drawing and stretching said ribbon downstream of said rolls, and cooling said ribbon under stretching stress.

JAMES BAILEY.

REFERENCES CITED

The following references are of record in the file of this patent:

UNITED STATES PATENTS

| Number | Name | Date |
|---|---|---|
| 898,111 | Huber et al. | Sept. 8, 1908 |
| 2,412,187 | Wiley | Dec. 3, 1946 |

FOREIGN PATENTS

| Number | Country | Date |
|---|---|---|
| 368,886 | Great Britain | Mar. 17, 1932 |
| 561,623 | Great Britain | May 26, 1944 |